United States Patent
Wortmann

[11] Patent Number: 6,103,993
[45] Date of Patent: Aug. 15, 2000

[54] HOLLOW ROTOR BLADE OF COLUMNAR STRUCTURE HAVING A SINGLE CRYSTAL COLUMN IN WHICH A SERIES OF HOLES ARE LASER DRILLED

[75] Inventor: Jürgen Wortmann, Weichs, Germany

[73] Assignee: Mtu Motoren-und Turbinen-Union Munchen GmbH, Munich, Germany

[21] Appl. No.: 09/337,858

[22] Filed: Jun. 21, 1999

Related U.S. Application Data

[62] Division of application No. 08/675,325, Jul. 10, 1996, abandoned.

[51] Int. Cl.[7] .................................................. B23K 26/00
[52] U.S. Cl. ........................... 219/121.71; 219/121.85; 219/121.7; 219/121.82
[58] Field of Search .................. 219/121.71, 121.85, 219/121.7, 121.82; 416/241 R

[56] References Cited

U.S. PATENT DOCUMENTS

| | | | |
|---|---|---|---|
| 3,008,855 | 11/1961 | Swenson | 148/32 |
| 3,965,963 | 6/1976 | Phipps et al. | 164/60 |
| 5,197,531 | 3/1993 | Hogo et al. | 164/122.1 |
| 5,222,617 | 6/1993 | Gregory et al. | 219/121.71 |
| 5,291,654 | 3/1994 | Judd et al. | 29/889.721 |
| 5,368,441 | 11/1994 | Sylvestro et al. | 416/97 R |
| 5,465,780 | 11/1995 | Muntner et al. | 164/516 |
| 5,611,670 | 3/1997 | Yoshinari et al. | 416/241 R |
| 5,773,790 | 6/1998 | Moore et al. | 219/121.71 |

FOREIGN PATENT DOCUMENTS

| | | |
|---|---|---|
| 1911049 | of 0000 | Germany . |
| 2949446 | of 0000 | Germany . |
| 1278224 | 6/1972 | United Kingdom . |
| 1362138 | 7/1974 | United Kingdom . |
| 2102317 | 6/1982 | United Kingdom . |
| 2189553 | 4/1986 | United Kingdom . |
| 2254112 | 1/1992 | United Kingdom . |
| 2270125 | 4/1993 | United Kingdom . |

OTHER PUBLICATIONS

Metals Handbook, 9$^{th}$ Ed, vol. 15, "Nickel and Nickel Alloys" pp 815–819, 1988.

CA 124:34 9646 of "Laser Drilling of Advanced Materials: effects of Peak Power, pulse format and wave length." 1995.

*Primary Examiner*—Patrick Ryan
*Assistant Examiner*—M. Alexandra Elve
*Attorney, Agent, or Firm*—Ladas & Parry

[57] ABSTRACT

A hollow structural part having an internal hollow space, preferably a blade for a turbodrive, is made of a metal alloy with a columnar structure solidified in an oriented manner with longitudinally extending grain boundaries. A series of holes are laser drilled in the blade to connect the outer surface of the blade with the hollow space. The blade is formed with a single crystal column in the region where the series of holes are formed so that the holes are away from the grain boundaries. Such structural parts are preferably used as the blade of a rotor and the laser drilled holes serve for supply of cooling air to the leading edge or pressure region of the blade or for influencing the position of the boundary layer on the suction side of the blade, or the laser-drilled holes are shaped as outflow openings for air to intensify a cooling film for increasing the blade efficiency.

7 Claims, 1 Drawing Sheet

HOLLOW ROTOR BLADE OF COLUMNAR STRUCTURE HAVING A SINGLE CRYSTAL COLUMN IN WHICH A SERIES OF HOLES ARE LASER DRILLED

This application is a divisional of application(s) application Ser. No. 08/675,325 filed on Jul. 10, 1996 now abandoned.

FIELD OF THE INVENTION

The invention relates to a structural part having a hollow, inner space, preferably a blade for a turbodrive mechanism, made of a metal alloy having a columnar structure solidified in an oriented direction and provided with longitudinally extending grain boundaries, and wherein a series of holes are provided in the structural part to connect the hollow inner space with the outer surface of the structural part.

BACKGROUND AND PRIOR ART

Such structural parts are used as blades for a turbodrive mechanism and the series of holes fulfill various functions, the holes being formed by various processes, such as laser drilling or electrochemical drilling. The formation of the holes disturbs the longitudinally extending grain boundaries, particularly if the spacing between the holes is small, since grain-boundary defects and grain-boundary precipitations represent nuclei for formation of corrosion cracks, which weaken the material between the holes due to the migration of the cracks. This can lead to premature failure of the structural part when high mechanical and thermal stresses are applied, and the service life of the turbodrive mechanism can be adversely reduced which leads to need for increased inspection and service time.

These disadvantages are particularly serious when the series of holes is formed by means of laser technology, and particularly for a columnar, crystallized structural part in which the position of the grain boundaries is not predictable. The position of the longitudinally extended grain boundaries is the result of the stochastic nucleation processes on a cold plate, from which the molten metal advances along a solidification front into a ceramic shell mold for the formation of the structural part. Further, the position of the grain boundaries is dependent on the crystallographic orientation of the nuclei with respect to the locally acting temperature gradients, whereby a natural grain selection occurs. Grains with a <001> orientation parallel to the temperature gradients are preferred with respect to growth kinetics, which leads to the fact that only a few grains grow out from a starter or from a cold plate.

Grain boundaries, which weaken the material, form between the grains, so that grain-boundary strengtheners, such as C, B or Zr are alloyed with the molten metal alloy for such structural parts. These strengtheners preferably precipitate at the grain boundaries during the solidification of the molten material; however, they reduce the melting point therein by up to 100° C.

If such grain boundaries are encountered during laser drilling, then, particularly in the case of thicker walls and longer drilling lengths, this leads to problems, since on the one hand, depositions of laser-vaporized material of up to several hundred micrometers may arise, in which cracks form, and on the other hand, a melting and a cracking of grain boundaries, up to 100 micrometers deep, may occur. The crack formations of the depositions and the grain boundaries may connect together and cause a serious weakening of the structural part, ultimately leading to failure of the turbodrive mechanism. Therefore, laser drilling of structural parts made of materials of columnar structure that are solidified in an oriented manner cannot be carried out in a cost-favorable way, particularly for dynamically highly-stressed blades in a turbodrive mechanism. In this case, one is obliged to use fundamentally more expensive single-crystal materials, whose production is more expensive and is associated with a high rate of rejection.

With thinner wall, the risk of formation of depositions is less in laser drilling, but there is the danger that when closely adjacent holes are formed, even with concurrent cooling to protect the thinner material from excess heating, grain-boundary cracks will be produced during the laser drilling which will weaken the structural part between the holes.

SUMMARY OF THE INVENTION

An object of the invention is to provide a structural part of the above type and a process for its production, which avoids weakening the structural part despite the formation of a columnar crystalline structure with longitudinally extending grain boundaries and with a series of holes therein.

A further object is to provide such a structural part made of a cost-favorable material and in which the series of holes can be formed by means of a cost-favorable process.

These and other objects are satisfied by forming the structural part as a body solidified in an oriented manner, which has single-crystal columns in the region of the series of holes and is thereby free of grain boundaries in said region.

The formation of the series of holes in single-crystal columns is not obvious from conventional techniques, since the position of the grain boundaries in the known art is not predictable whereas the position of the series of holes for the structural parts of turbodrive mechanisms is precisely located according to precalculated fluid-mechanically optimized criteria and cannot be modified or displaced to avoid a grain-boundary structure for a moderately-priced columnar solidified material. Thus, the formation of the part with single-crystal columns in the region of the series of holes, avoids the disadvantages in the manufacture of the conventional parts, and precludes formation of grain boundary cracks in the structural part.

In a preferred embodiment of the invention, the series of holes extend in the longitudinal direction of the blade. This orientation is primarily based on fluid mechanics, but it also confers a compatibility with the single-crystal columns, formed according to the invention, in the region of the series of holes, so that the single-crystal column is available over the full length of the series of holes.

In another preferred embodiment of the invention, the series of holes are formed by laser drilling. Since the materials, which are used in turbodrive mechanisms, particularly in rotor and turbine blades disposed in the flow channels of such mechanisms, are of such high strength that conventional metal-removing drilling processes cannot be used, the series of very fine holes is produced electrochemically, which is an extremely complicated, time-consuming and expensive process, but which could not be circumvented in the case of conventional material that possesses grain boundaries in the region of the series of holes. Since laser-drilled holes can be advantageously produced more rapidly and inexpensively, the invention makes possible the production of structural parts of a material at moderate cost with holes produced at moderate cost.

The process for producing the structural part described above includes the following process steps:

a) preparing a casting mold with openings for receiving cores for forming a hollow space in the product to be cast in the mold;

b) casting molten metal alloy into said mold such that said alloy solidifies as a solid body, with a hollow internal space, in a longitudinal growth direction with a columnar structure oriented in said longitudinal growth direction and defining longitudinal grain boundaries;

c) incorporating means in said casting mold defining a narrow channel in which oriented solidification of said molten metal alloy takes place to produce a large volume single-crystal region in said growth direction extending from said channel along the length of the cast solid body; and d) laser drilling in said single-crystal region, a series of holes extending through said solid body to the hollow internal space, said series of holes being spaced longitudinally along said body in said single-crystal region and away from said grain boundaries.

The process of the invention has the advantage that the already existing and practical system for fixing the position of the core, which is necessary for the production of the hollow space in the hollow structural part can be used to form said channel and thus provide a further function for this system. In a particular embodiment, a cross member is used to carry the core in the mold to form the hollow space and, according to the invention a second cross member is included in the mold in facing relation with the first cross member to constitute the means which forms said narrow channel. The narrow channel selects the preferred crystal orientation, so that a single-crystal column grows at the outlet of said channels. In order to completely utilize the advantages of the invention, in the case of oriented solidification in the lower region of the structural part, where the series of holes is not necessary, the cross members are arranged such that said narrow channel is formed directly between the cross members, where a single-crystal column will grow in the columnar structure for the material for formation therein later of the series of holes.

However, the invention can also be carried out independently of the carrying and fixing function of the original cross member, by preparing an appropriately narrow channel for molten material passage in the lower region of the mold for the nucleation of a single-crystal column in the region where the later series of holes is to be formed.

In some cases, more than one series of holes can be formed in the structural part, and in such cases, a respective channel is provided in the mold to form a corresponding single crystal for the associated series of holes.

The structural part is preferably used as a blade of a rotor and the laser-drilled holes are utilized for supplying cooling air in the leading edge or pressure region of the blade. This region of a structural part of a turbodrive mechanism is particularly highly heated and a cooling film is formed by means of the cooling air flowing out of the series of holes, which protects the blade.

In another preferred use, the structural part is utilized as the blade of a rotor and the laser-drilled holes are arranged on the suction side of the blade to influence the boundary layer of air thereon. In such cases, a series of holes for cold air that flows in or out advantageously increases the efficiency of a drive mechanism, by aerodynamically modifying the blade profile.

In another preferred use, the structural part is utilized as a turbine blade and the laser-drilled holes are formed as outflow holes for forming a cooling film for increasing the blade efficiency. The efficiency is advantageously increased in this way, since the turbine can be driven with a higher inlet temperature.

DETAILED DESCRIPTION OF PREFERRED EMBODIMENTS

Figure 1:
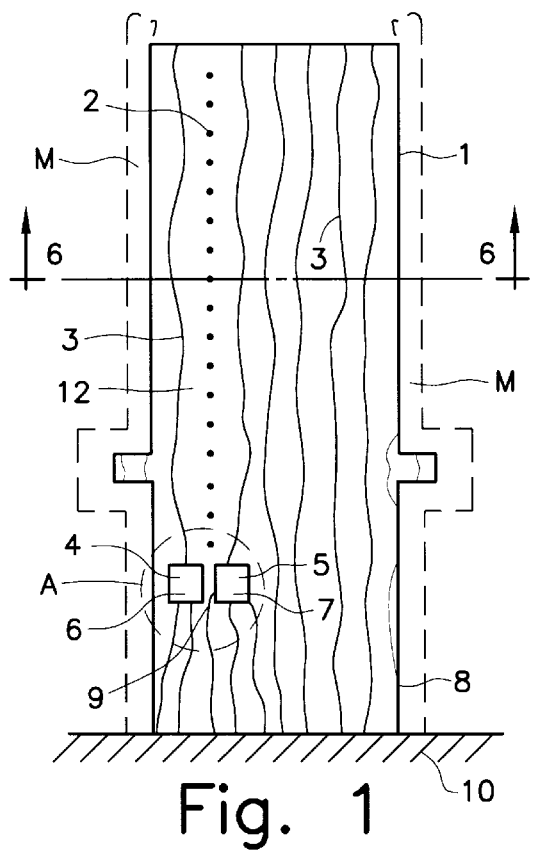
FIG. 1 is a diagrammatic, elevation view of a blade according to the invention.
Figure 6:
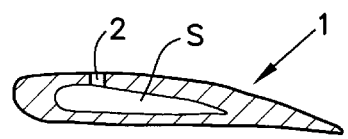
FIG. 6 is a cross-section taken along line 6—6 in FIG. 1.

FIG. 1 of the drawing shows a structural part in the form of a blade 1 with an airfoil cross-section as seen in FIG. 6. The blade 1 is formed with an internal, hollow space S and the blade is provided with a series of holes 2 which connect the hollow space S within the blade to the ambient atmosphere. The blade 1 can be used as a blade disposed in the flow channel of a turbine drive mechanism. The blade 1 is formed as the solidified product of a molten metal alloy which solidifies in the longitudinal direction of the blade and forms a columnar structure oriented in the longitudinal direction of the blade and provided with longitudinally extending grain boundaries 3.

According to the invention, the blade 1 is formed with a single crystal column 12, in a manner to be described more fully later, the column 12 being free of grain boundaries 3, said holes 2 being formed in said single crystal column thereby to be away from said grain boundaries 3.

The metal blade is cast in a mold M, diagrammatically illustrated in dotted outline in FIG. 1. The mold M is provided with cross members 6, 7 extending transversely through the mold in a foot 8 of the blade and the cross members carry a casting core (not shown) which forms the hollow space S within the blade. The cross members 6, 7 form openings 4, 5 in the foot of the cast blade 1. The cross members 6, 7 face one another and define therebetween a narrow channel or passage 9 which constricts the molten metal therein and causes the formation of the single crystal from above the passage 9 to the upper end of the blade 1.

After the molten metal is cast into the casting mold (and is constricted in passage 9), the molten metal solidifies in a preferred orientation <001> on a cold plate 10 at the base of the blade foot 8. The solidification front advances under the influence of the temperature gradient from the base to the top and traverses the cross members 6, 7 whereby extremely favorable growth conditions for the preferred orientation <001> prevail in the narrow passage 9 so that at the upper end 11 of passage 9 only one crystal of the preferred orientation exists and a completely single crystal column 12 grows therefrom to the upper end of the blade.

The holes 2 are formed in the single crystal by relatively inexpensive laser drilling and the holes are remote from the grain boundaries 3. The passage 9 between cross members 6, 7 is precisely positioned so that single crystal column 12 will be formed exactly in the region in which the series of holes 2 are to be formed.

Figure 5:
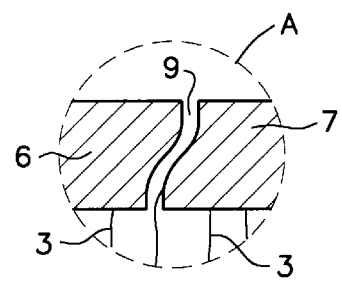
FIG. 5 shows a modified version of detail A.

A more intense selection of the preferred orientation can be obtained by making the passage of wave form, as shown in FIG. 5. For this purpose, the opposed surfaces of the cross members shaped as curved surfaces.

After casting, the cross members 6, 7 are removed to leave openings 3 and 4 in the foot 8 of the blade. Normally, in the conventional process, a single cross member (e.g. cross member 6) is used to hold the core. The invention provides the second cross member (e.g. cross member 7) to cooperate with the first cross member and form the narrow passage 9.

Figure 2:
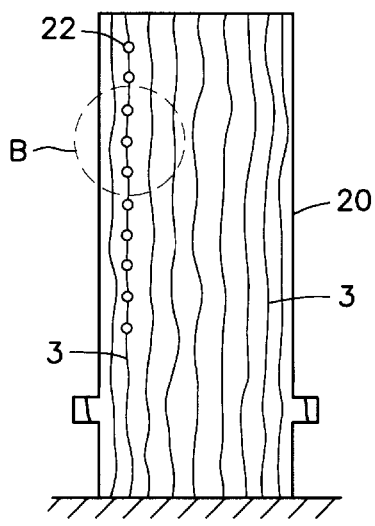
FIG. 2 is a similar view of a conventional blade.
Figure 4:
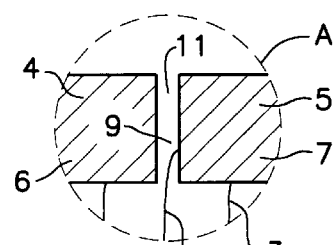
FIG. 4 is an enlarged view of a detail A in FIG. 1.
Figure 3:
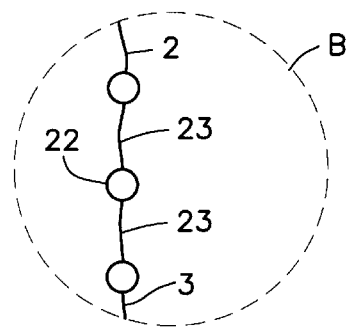
FIG. 3 is an enlarged view of a detail B in FIG. 2.

FIG. 2 shows a conventional blade 20 with a series of holes 22, the blade having randomly grown columnar grain boundaries 3. FIG. 3 shows an enlarged view of detail B with a series of holes 22. By forming the holes 22 at or near the grain boundaries 3, microcracks 23 are produced, proceeding from each hole 22. These microcracks may extend up to 100 micrometers in length, along the grain boundaries. If the distance between two holes is 1 mm and the hole diameter is 0.8 mm, the structural part can crack along the grain boundaries 3 under a relatively small load causing the blade to fail.

The invention thus provides a blade and its method of manufacture by which the holes 2 can be formed in the blade by relatively inexpensive laser drilling away from the grain boundaries 3. When the blade is used as a rotor blade, for example, in a turbodrive mechanism, the holes 2 can be used to blow cool air at the surface of the blade especially in the leading edge or pressure region of the blade and form a cooling film on the blade to protect the blade and prevent overheating. The holes 2 can also be used to blow air at the suction surface of the blade (upper surface) to adjust or control the position of a boundary layer on said surface. When used as a turbine blade, the holes 2 are used as discharge outlets for air to intensify a cooling film for increasing efficiency. The air is supplied in conventional manner to the holes 2 via the hollow inner space S in the blade.

Although the invention has been described in relation to specific embodiments thereof, it will become apparent to those skilled in the art that numerous modifications and variations can be made within the scope and spirit of the invention as defined in the attached claims.

What is claimed is:

1. A method of producing a blade for a turbo drive mechanism made from a metal alloy comprising:

providing a casting mold, casting a molten metal alloy into said mold such that said alloy solidifies as a solid blade having an aerodynamic blade portion and a foot portion, the blade being formed with a hollow, internal space the molten metal solidifying in a longitudinal growth direction to form a columnar structure in said aerodynamic blade portion oriented in said longitudinal growth direction defining a plurality of longitudinal grain boundaries in said aerodynamic blade portion, incorporating means in said casting mold defining a narrow channel below said aerodynamic blade portion in which said molten metal alloy is constricted so that during formation of said columnar structure a large volume single crystal region is formed in said growth direction extending from said channel along the length of the cast blade such that said aerodynamic blade portion comprises said single crystal region integrated with said columnar structure, and laser drilling in said single crystal region a series of holes extending through said blade to the hollow internal space, said series of holes being spaced longitudinally in said aerodynamic blade portion in said single crystal region and away from said grain boundaries of the columnar-structure in said aerodynamic portion.

2. A method as claimed in claim 1, wherein said, said laser drilling forms said series of holes in a leading edge region of said aerodynamic blade portion.

3. A method as claimed in claim 2, wherein said method further comprises discharging cool air from said space through said series of holes to an outer surface of the blade.

4. The structural part obtained by the process of claim 1.

5. A method as claimed in claim 1, comprising forming said narrow channel with a curved shape.

6. A method as claimed in claim 1, wherein said means is formed in a foot region of said casting mold by cross-members facing one another to define said narrow channel therebetween.

7. A method as claimed in claim 6, wherein said mold forms an open passage area around said narrow channel for forming said columnar structure concurrently with said single crystal region in said aerodynamic blade portion.

* * * * *